United States Patent [19]

Stern et al.

[11] Patent Number: 4,994,546
[45] Date of Patent: Feb. 19, 1991

[54] PROCESS FOR PREPARING BISPHENOL POLYARYLATES

[75] Inventors: Brian A. Stern, Evans; Richard Layton, Augusta, both of Ga.

[73] Assignee: Amoco Corporation, Chicago, Ill.

[21] Appl. No.: 477,440

[22] Filed: Feb. 9, 1990

[51] Int. Cl.$^5$ .................. C08G 63/00; C08G 63/02
[52] U.S. Cl. .................. 528/194; 528/176; 528/179; 528/180; 528/271
[58] Field of Search ............ 528/176, 179, 180, 194, 528/271

[56] References Cited

U.S. PATENT DOCUMENTS

| 2,594,343 | 4/1952 | Pines et al. | 585/332 |
| 3,225,003 | 12/1965 | Macon et al. | 528/194 |
| 3,317,464 | 5/1967 | Conix et al. | 528/176 |
| 3,684,766 | 8/1972 | Jackson, Jr. et al. | 525/437 |
| 3,780,148 | 12/1973 | Jackson, Jr. et al. | 264/141 |
| 3,824,213 | 7/1974 | Stackman et al. | 528/271 |
| 3,948,856 | 4/1976 | Stackman | 528/271 |
| 4,075,173 | 2/1978 | Maruyama et al. | 528/206 |
| 4,294,956 | 10/1981 | Berger et al. | 528/179 |
| 4,294,957 | 10/1981 | Berger et al. | 528/179 |
| 4,296,232 | 10/1981 | Maresca et al. | 528/179 |
| 4,311,823 | 1/1982 | Imai et al. | 528/181 |
| 4,313,870 | 2/1982 | Imai et al. | 524/783 |
| 4,314,051 | 2/1982 | Berger et al. | 528/179 |
| 4,327,205 | 4/1982 | Kato et al. | 528/128 |
| 4,374,239 | 2/1983 | Berger et al. | 528/176 |
| 4,639,504 | 1/1987 | Cottis | 528/176 |
| 4,742,149 | 5/1988 | Finestone | 528/179 |

FOREIGN PATENT DOCUMENTS

| 0870619 | 3/1979 | Belgium . |
| 46287 | 4/1979 | Japan . |
| 46291 | 4/1979 | Japan . |

*Primary Examiner*—Harold D. Anderson
*Assistant Examiner*—T. Mosley
*Attorney, Agent, or Firm*—William H. Magidson; Ralph C. Medhurst

[57] ABSTRACT

Process for preparing polyarylates comprising the steps of (a) prepolymerizing a diester of Bisphenol-A with at least one aromatic dicarboxylic acid to form a prepolymer having a melting point of at least about 200° C. and being fluid at the polymerization temperature; followed by (b) polycondensing said prepolymer under agitation until it is substantially transformed into a powdery solid; maintaining said agitation to keep the powdery solid in a polydispersed solid state; and continuing the polymerization below the agglomeration temperature of the polymerizing solid, until the desired molecular weight is reached.

7 Claims, No Drawings

PROCESS FOR PREPARING BISPHENOL POLYARYLATES

FIELD OF THE INVENTION

Process for the preparation of bisphenol polyarylates having a reduced viscosity of at least 0.4 dl/g comprising the prepolymerization of a diester of Bisphenol-A with at least one benzene dicarboxylic acid selected from the group consisting of isophthalic and terephthalic acids wherein isophthalic acid comprises at least 75 percent or no more than 25 percent of the benzene dicarboxylic acid followed by heating the initially fluid prepolymerization mixture under agitation until it is substantially transformed into a powdery solid. The agitation must be sufficient to maintain the polymerizing mixture in a polydispersed solid state without agglomeration.

The process allows for the inexpensive preparation of excellent quality crystalline, free-flowing Bisphenol-a polyarylate granulates.

BACKGROUND OF THE INVENTION

Solid state polymerization techniques for the preparation of polymers such as aromatic polyesters have been described; see, for example, Imai et al, U.S. Pat. Nos. 4,311,823 and 4,313,870; Kato et al, U.S. Pat. No. 4,327,205; Japanese Laid-Open Publications 79/46,287 and 79/46,291; and Belgian Patent No. No. 870,619. The processes claimed in the above patents consists in first preparing a prepolymer which is then solid state advanced to the required molecular weight. Thus Imai et al., U.S. Pat. No. 4,311,823 describe a process for preparing polyesters which utilizes three reaction vessels; wherein a dicarboxylic acid, an aromatic diol, and optionally hydroxybenzoic acid are reacted in the first vessel with an anhydride, such as acetic anhydride, to form the acetate monomers; acetic acid and excess of acetic anhydride are removed followed, if desired, by oligomerization of the mixture via heating at from about 150° C. to about 280° C.; the mixture is transferred to the second vessel where it is advanced to the prepolymer stage; depending on the temperature and on the degree of polymerization the resulting prepolymer is either a molten liquid which is cooled and pelletized prior to further reaction; or a polydispersed solid. The prepolymer is transferred to the third vessel where it is advanced in the solid state at elevated temperatures to yield the final polymer.

Processes wherein all of said three steps are performed in one reactor are described in, for example, U.S. Pat. Nos. 4,313,870 and 4,327,205. In both patents the prepolymer formation is conducted with application of sufficient shearing (or agitating) force to prevent polymer agglomeration, at a temperature and for a period of time such that the initially liquid reaction mixture is transformed into a polydispersed solid, which is then further reacted to high polymer below its sintering temperature.

The aforementioned patents disclose the preparation of a wide range of aromatic polyesters and other polymers. Examples, however, are limited to the rapidly crystallizing and highly crystalline poxybenzoyl based polyesters and to selected aromatic polyamides. No experimental conditions suitable for preparing the moderately crystalline Bisphenol-a polyarylates are suggested, nor is any technique disclosed for producing amorphous polymers although the patentees in some cases claim such polymers.

Polyarylates are polyesters derived from monomers consisting essentially of a dihydric phenol, particularly 2,2-bis(4-hydroxyphenyl)propane, also identified as Bisphenol-A, and an aromatic dicarboxylic acid, particularly mixtures of terephthalic and isophthalic acids. These polyarylates are high temperature, high performance thermoplastic polymers with a good combination of thermal and mechanical properties. In addition, the polymers display outstanding UV stability. Polyarylates have good processibility which allows them to be molded into a variety of articles.

Many processes have been described in the literature for the preparation of polyarylates. One such process is the diacetate process. In the diacetate process, a dihydric phenol is converted to its diester derivative, which is then reacted with an aromatic dicarboxylic acid to form the polyarylate. Jackson et al, U.S. Pat. Nos. 3,684,766 and 3,780,148 describe a four step diacetate process for producing polyarylates. In the patented processes, in the first step a prepolymer is formed from, for example, a diacetate, such as Bisphenol-a diacetate, and an aromatic acid, in the presence of a catalyst. In the second step, the prepolymer so formed is comminuted into small particles. In the third step, these particles are contacted with a crystallizing agent to crystallize the polyester. This may be accomplished by placing the particles in a fluidized bed reactor and contacting them with the crystallizing agent in the reactor. The patent states that the crystallizing step is necessary because it allows to build up the molecular weight of the prepolymer in the next to a satisfactory level without fusing or sticking of the particles. The fourth step involves heating the crystallized bisphenol polyester in the presence of an inert gas, optionally in a fluidized bed, at a temperature below the melting point and for a period of time which is sufficient to achieve an inherent viscosity of at least 0.5 in the final polymer.

The crystallization step described in U.S. Pat. Nos. 3,684,766 and 3,780,148 can be a slow, time consuming and expensive operation.

Maruyama et al, U.S. Pat. No. 4,075,173 describe the preparation of copolyesters by reacting an aromatic dicarboxylic acid, a diacetate of Bisphenol-a and an acetate of p-hydroxybenzoic acid. Various processes for producing polyarylates by the reaction of Bisphenol-A and terephthalic and isophthalic acids are reviewed in this patent. The following process for producing polyarylates, identified as route (1), is described in column 2, of the patent:

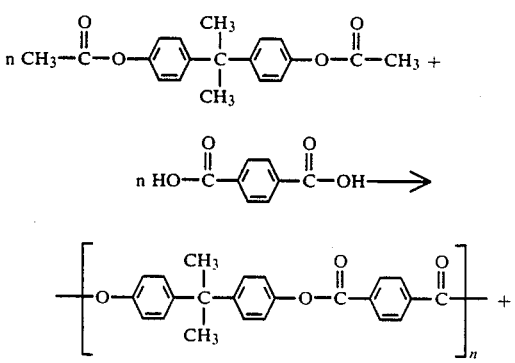

2n CH₃CO₂H

This process is the diacetate process as described herein, or the "Acetate Process" as defined in the patent.

Column 2 of the patent states:

"The route (1) is not desirable because the undesirable coloration and deterioration of polymer are particularly remarkable as disclosed in the above mentioned literature."

Further, column 3 of the patent states:

"On the other hand, the route (1), Acetate Process, is economically advantageous because the materials used are cheap and the operation is simple. For example, diacetate of Bisphenol-A, a monomer for Acetate Process, is synthesized by merely reacting acetic anhydride and Bisphenol-A. Consequently, it may be said that, if the fatal drawbacks of Acetate Process, coloration and deterioration, are solved, Acetate Process will become the most superior process."

Thus, the skilled workers in the field of polyarylate chemistry realize that the existing processes for producing polyarylates have one or more deficiencies, and that a need exists to develop a viable diacetate process for producing polyarylates.

In U.S. Pat. No. 4,075,173, a copolyester was prepared by the diacetate process by a solid-state polymerization of low molecular weight prepolymers without using crystallizing agents. The patentees state that their Acetate Process is possible only when specific monomers are combined to form the prepolymer. These monomers are the diacetate of Bisphenol-A, terephthalic acid and/or isophthalic acid and an acetate of p-hydroxybenzoic acid. The prepolymer is then converted to the desired high molecular weight polymer by solid state polymerization. Specifically, in the process of said patent, a prepolymer is first prepared by condensing the acetate of p-hydroxybenzoic acid, Bisphenol-A diacetate with isophthalic and/or terephthalic acids at a temperature of from 200° C. to 380° C. for 1 to 10 hours. Catalysts capable of accelerating an ester exchange reaction can be used. The prepolymer is pulverized or pelletized and heated under reduced pressure or in an inert gas to convert it into a high molecular weight polymer.

Note, however, that the process of said U.S. Pat. No. 4,075,173 requires the use of p-hydroxybenzoic acid and produces polyarylates containing p-oxybenzoyl moieties. On the other hand, the processes described in U.S. Pat. Nos. 3,684,766 and 3,780,148 require the use of crystallizing agents in a crystallizing step.

Berger et al., U.S. Pat. No. 4,314,051 disclose a process for preparing polyarylates which comprises: (a) forming a polyarylate prepolymer having a reduced viscosity of from about 0.05 to about 0.4 dl/g by reacting at least one diester derivative of a dihydric phenol with at least one aromatic dicarboxylic acid in the presence of a solvent at a temperature of from about 250° C. to 300° C., and (b) heating the prepolymer so formed below its melting point to form a polyarylate having a reduced viscosity of from about 0.45 to about 1.2 dl/g. As indicated above the preparation of the polyarylate prepolymer is carried out in the presence of a solvent. The preferred solvents are a diphenyl ether compound as described in Berger et al., U.S. Pat. No. 4,294,956; and in Maresca et al., U.S. Pat. No. 4,296,232; a cycloaliphatic substituted aromatic or heteroaromatic compound as described in Berger et al., U.S. Pat. No. 4,294,957; and a halogenated and/or etherated substituted aromatic or heteroaromatic compound as described in Berger et al., U.S. Pat. No. 4,374,239. In this process solvent is desirable for minimizing color bodies in the polyarylate.

The process of U.S. Pat. No. 4,314,051 represents a significant improvement over the processes of U.S. Pat. Nos. 3,684,766 and 3,780,148 since it eliminates the need for a separate crystallization step of the prepolymer and does not require the use of an esterification catalyst. However, the use of a solvent entails the need for recovery and purification, which in turn increases the polymer cost.

Therefore, a need exists for an economical and practical diacetate process for producing high molecular weight polyarylates where color is immaterial such as in pigmented parts and printed parts.

It has now been discovered that certain Bisphenol-A polyarylates can be prepared by a bulk process.

THE INVENTION

The present invention is directed to a process for preparing polyarylates which comprises: (a) the prepolymerization of a diester (e.g. diacetate) of Bisphenol-A or mixtures of bisphenols comprising Bisphenol-A with at least one benzene dicarboxylic acid selected from the group consisting of isophthalic and terephthalic acid wherein isophthalic acid comprises at least 75 percent or no more than 25 percent of the benzene dicarboxylic acid to give a prepolymer having a melting point of at least 200° C. which is fluid at the polymerization temperature; followed by (b) polycondensing said prepolymer neat under agitation until it is substantially transformed into a powdery solid without agglomeration; maintaining sufficient agitation to keep the polymerizing mixture in a polydispersed non-agglomerated solid state; and continuing the polymerization below the agglomeration temperature of the polymerizing solid, until the desired molecular weight is reached. It is essential that the benzene dicarboxylic acid comprises from 0 to 25 percent or 75 to 100 percent isophthalic acid and correspondingly from 100 to 75 percent or 25 to 0 percent terephthalic acid. Failure to operate within these proportions leads to agglomeration or melting of the polyarylate.

The polyarylate prepolymer is formed by reacting at least one diester derivative of a dihydric phenol having the following formula:

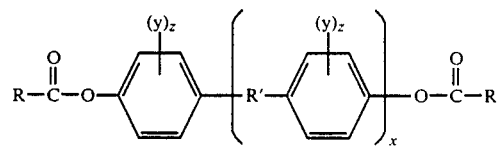

wherein R is independently selected from an alkyl radical having from 1 to about 6 carbon atoms, preferably methyl, cycloalkyl having from 4 to about 7 carbon atoms; y is independently selected from alkyl groups of 1 to 4 carbon atoms, chlorine or bromine; z independently has a value of from 0 to 4, inclusive; and R' is independently selected from a divalent saturated aliphatic hydrocarbon radical, particularly alkylene or alkylidene radicals having from 1 to 8 carbon atoms, especially $C(CH_3)_2$, and cycloalkylene or cycloalkylidene radicals having up to and including 9 carbon atoms.

The diester derivative of the dihydric phenol is prepared by reacting a dihydric phenol with an acid anhydride derived from acids containing from 2 to 8 carbon atoms under conventional esterification conditions. The preferred acid anhydride is acetic anhydride. The reaction of the dihydric phenol with the anhydride can be performed in the presence or absence of solvent, with or without a catalyst. Generally, however, no solvent is used in these preparations. It should also be noted that in the preferred embodiment of the invention the diester derivative is prepared in-situ, in the presence of the dicarboxylic acid; and that its preparation is followed directly by prepolymerization, i.e. step (a).

The dihydric phenols that can be used int his invention include the following:
2,2-bis(4-hydroxyphenyl)propane,
bis(2-hydroxyphenyl)methane,
bis(4-hydroxphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxyphenyl)pentane,
3,3-bis(4-hydroxyphenyl)pentane,
2,2-bis(4-hydroxyphenyl)heptane, and
1,2-bis(4-hydroxyphenyl)-1,2-bis(phenyl)propane.

Bisphenol-A constitutes at least 50 mole percent and preferably 100 mole percent of the dihydric phenols.

As indicated above, the isophthalic acid to terephthalic acid ratio is within the ranges of from about 100:0 to about 75:25 and from about 25:75 to about 0:100; preferably within the ranges from about 95:5 to about 80:20 and from about 20:80 to about 5:95.

The polyarylate prepolymer prepared in step (a) has a reduced viscosity of from about 0.05 to about 0.4, preferably from about 0.1 to about 0.25 dl/g. The reduced viscosity of the final Bisphenol-A polyarylate is in the range of from about 0.4 to about 1.5, preferably from about 0.8 to about 1.2 dl/g. All reduced viscosities were measured in p-chlorophenol, at 50° C., at a concentration of 0.2 g/100 ml.

Broadly considered, the instant process involves an alkanoylation reaction in which Bisphenol-A and the benzene dicarboxylic acid(s) are reacted with an acid anhydride; the prepolymer forming reaction in which the product resulting from the alkanoylation is polycondensed to a relatively low degree of polymerization; and the final polycondensation yielding a polyarylate having the required molecular weight.

Thus, in somewhat greater detail, the instant Bisphenol-A polyarylates are prepared by charging into a first reactor the required amounts of 2,2-bis(4-hydroxyphenyl)propane ("Bisphenol-A") and isophthalic and terephthalic acids. An anhydride of a lower monocarboxylic acid, preferably an anhydride of a $C_2$ to $C_8$ monocarboxylic acid, is added in at least stoichiometric amounts. It is most preferred to use acetic anhydride; its amount is preferably from about 5 to about 20 mole percent over that required for the acetylation of all of the hydroxyl groups. The acetylation reaction takes place at about 140° C. to 150° C. for a period of time of from about 2 to about 6 hours. The reaction mixture is then heated to about 270° C. to 320° C., preferably to about 290° C. to 300° C.; at a rate of about 10 to about 65, preferably of about 20° C. per hour. It was surprising to discover that the rate at which the temperature is increased has a profound effect upon the physical state of the prepolymer, i.e. on its molecular weight. Optimum rates vary from each particular polyarylate. In addition, it was also unexpectedly found that these optimum rates at which the temperature is increased are dependent upon the terephthalic acid to isophthalic acid ratio; indeed, as this ratio increases, it is preferable to heat the polymerizing mixture at progressively faster rates in order to obtain the desired, easy to handle, liquid prepolymer having a moderate viscosity. It was established that at the stage at which the prepolymerization step (a) is complete, i.e. when the mixture has reached the temperature of about 270° C. to 320° C., the amount of acetic acid distillate (indicative of the degree of polymerization) is in the range of from about 85 to about 99 percent of theory and the prepolymer has a melting point of at least 200° C. If the prepolymer has a melting point below 200° C. polycondensation is too sluggish to use this process.

The liquid prepolymer from step (a) is now transferred to a stirred reactor, preferably a sigma blade mixer, which is preheated to about 260° C. to 310° C., preferably to about 270° C. to 300° C. Polycondensation at the indicated temperatures, under agitation results in the reaction mixture being substantially transformed into a powdery solid. The agitation must be sufficient to maintain the polymerizing mixture in a polydispersed solid state and the polymerization is continued at a temperature below the agglomeration temperature of the polymerizing solid, until the desired molecular weight is reached. Generally, adequate molecular weights are obtained within about 3 to about 7 hours, and the polyarylate is a free-flowing easy to handle granulate.

The present polyarylate process is conducted in an inert atmosphere such as argon, helium, or nitrogen, under atmospheric pressure. However, lower or higher pressures may also be used. The polymerization reaction of this invention may be carried out batchwise or continuously. Moreover, the reactants may be added to the polymerization zone in any way or order desired.

The polymerizations can be performed with or without the addition of a catalyst. Typical catalysts include acids, such as p-toluene sulfonic, phosphoric or sulfuric acids; anhydrous sodium acetate; mixtures of p-toluene sulfonic acid with antimony trioxide or butyl ortho-titanate; cobalt, nickel and manganese salts of organic acids; magnesium, salts of organic and inorganic acids; salts of transition metals; and the like; Acidolysis reactions utilizing the above-listed catalysts are described in, for example, U.S. Pat. Nos. 2,594,343; 3,225,003; 3,317,464; 3,824,213; 3,948,856; 3,684,766; and 4,296,232. The catalyst is present in the reaction mixture in catalytically effective amounts; these can be, for example, from about 1 to about 1000, preferably from about 10 to about 50, parts per million, based on the weight of the polyarylate produced. Magnesium salts, in particular magnesium acetate, are the preferred catalysts.

The reaction of the diester derivatives of the diphenolic compounds with the aromatic dicarboxylic acids is performed with these reactants present in amounts from about 0.85:1.00 to about 1.10:1.00, preferably from about 0.98:1.02 to about 1.02:0.98, diester derivative(s): aromatic dicarboxylic acid(s).

The polymerizations can be performed in the presence of stabilizing amounts of phosphites, as described in Cottis, U.S. Pat. No. 4,639,504, hereby incorporated by reference. The phosphite can be an organic or inorganic phosphite, However, the use of an organic phosphite, such as an alkyl phosphite, an aryl phosphite, an alkyl-aryl phosphite or a di- or polyphosphite is preferred. More particularly, the following phosphites can be employed:
Diisooctyl Phosphite
Distearyl Phosphite (Solid)
Triisodecyl Phosphite
Triisooctyl Phosphite
Trilauryl Phosphite
Diphenyl Phosphite
Trisnonylphenyl Phosphite
Triphenyl Phosphite
Diphenylisodecyl Phosphite
Diphenylisooctyl Phosphite
Phenyldiisodecyl Phosphite
Diisodecyl Pentaerythritol Diphosphite
Tetraphenyl Dipropyleneglycol Diphosphite
Poly(dipropyleneglycol)Phenyl Phosphite
Dilauryl Phosphite
Ethyl Hexyl Diphenyl Phosphite
Phenyl Neopentylglycol Phosphite
Diisooctyl Octylphenyl Phosphite
Distearyl Pentaerythritol Diphosphite (Flake)
Triphenyl phosphite is the preferred stabilizer.

While the addition of the phosphite at any stage of the procedure is contemplated, it has been found to be particularly effective, and to provide markedly superior properties in the articles molded from the polyarylate resin, if the phosphite is added to the prepolymer when the temperature of the latter has reached the range of about 270° C. to 315° C., i.e. just about at the time when step (a) has been completed.

In another approach to the determination of the optimum point for addition of the phosphite, it has been found that the phosphite can most advantageously be added at about 95 percent conversion as indicated by the distillate yield of acetic acid.

The phosphite can be added as solid flakes or as a liquid melt at a temperature above the melting point of the phosphite. It is also possible to add the phosphite in a solution in acetic anhydride when incorporation is effected at a lower temperature. Addition in melt form is in general preferred.

The amount of phosphite added is dependent on the purity of the monomer. The purer the monomer, the less phosphite need be added to achieve the desired result.

Broadly, the amounts of phosphite used are in the range of about 1 to about 1000 ppm based on the weight of the polymer. Amounts in the range of from about 10 to about 500 ppm are preferred.

One of the preferred variants of the polymerization is described in Finestone, U.S. Pat. No. 4,742,149. This particular embodiment comprises adding a salt, particularly an alkaline earth metal salt or an alkali metal salt, preferably potassium sulfate, during the preparation of the resin and, particularly to the prepolymer melt prior to advancement of the final product to the desired degree of polymerization.

The polyarylates of the instant invention can be prepared in the presence of materials such as molecular weight regulators, antioxidants, and the like. These polyarylates may be used together with the well-known additives such as plasticizers, pigments, lubricating agents, mold release agents, inorganic and/or organic fillers and fibers, and the like.

EXAMPLES

The following examples serve to give specific illustrations of the practice of this invention, but they are not intended in any way to limit the scope of this invention.

EXAMPLE 1

This example illustrates the process of the instant invention. The polyarylate is based on Bisphenol-A, and terephthalic and isophthalic acids at a mole ratio of 85/15.

The following ingredients were combined in the manner described.

| Item | Ingredient | Amount (kg) | Moles |
|------|------------|-------------|-------|
| A | Terephthalic Acid | 6,304 | 37.95 |
| B | Isophthalic Acid | 1,112 | 6.69 |
| C | Bisphenol-A | 10,192 | 44.64 |
| D | Acetic Anhydride | 10,483 | 102.68 |
| E | Magnesium Acetate Tetrahydrate | 7 gm | 50 ppm |

Items A through E were charged to a 15 gallon, oil heated Hastelloy C vessel equipped with an anchor type stirrer, reflux condenser, after condenser, and distillate receiver.

After purging with nitrogen, the contents were heated with stirring to 140° C. (reflux) and held at that temperature for 3 hours. The reaction mixture was then heated at a rate of 40° C. per hour to 303° C. At that point, 93 percent of theoretical distillate were collected and the prepolymer had a reduced viscosity of 0.15 dl/g. The contents of the reactor were transferred to a sigma blade mixer which was preheated to 300° C. Polymerization at the latter temperature was continued for five hours. A free-flowing polyarylate granulate having a reduced viscosity of 0.87 dl/g was obtained.

EXAMPLE 2

This example shows that polyarylates yield essentially amorphous solids after a first DSC heating cycle. All polyarylates were based on Bisphenol-A, terephthalic (TPA) and isophthalic (IPA) acids. The acid ratios, reduced viscosities and melting points of the starting polyarylates are indicated in TaBle 1. The polymers were heated at a rate of 20° C. per minute to 400° C. and cooled at a rate of 10° C. per minute to room temperature. The first cycle was then repeated at the same heating and cooling rates. The results are summarized in Table 1. It is obvious that all crystallinity was molten out after the first heating cycle.

TABLE 1

| | | | DSC Results with Polyarylates | | | |
|---|---|---|---|---|---|---|
| | | | First Cycle | | Second Cycle | |
| TPA/IPA | Starting Polyarylate | | Endothermic Energy (J/gm) | Exothermic Energy (J/gm) | Endothermic Energy (J/gm) | Exothermic Energy (J/gm) |
| Mole Ratio | RV (dl/g) | $T_m$ (°C.) | During Heatup | Upon Cooldown | During Heatup | Upon Cooldown |
| 100/0 | 0.29 | 324 | 65.9 | 0 | 0 | 0 |
| 95/5 | 0.41 | 315 | 55.8 | 0 | 0 | 0 |
| 90/10 | 0.52 | 293 | 49.8 | 0 | 0 | 0 |
| 85/15 | 0.39 | 291 | 39.7 | 0 | 0 | 0 |
| 80/20 | 0.59 | 255 | 35.6 | 0 | 0 | 0 |

EXAMPLE 3

This example shows the effect of heating rate upon the physical state of the prepolymer. The data were obtained on an 85/15 (TPA/IPA)-Bisphenol-A based polyarylate.

The prepolymer was prepared using a 2 liter, 4 neck flask, equipped with a mechanical stirrer, nitrogen inlet tube, thermometer and condenser. Into the flask were placed:

| Ingredient | Amount (gm) | Moles |
|---|---|---|
| Acetic Anhydride | 398.4 | 3.90 |
| Terephthalic Acid | 239.6 | 1.44 |
| Isophthalic Acid | 42.3 | 0.25 |
| Bisphenol-A | 387.3 | 1.69 |
| Magnesium Acetate Tetrahydrate | 0.27 | 50 ppm |

The contents were stirred and purged with nitrogen. They were then heated to reflux (140° C.) and maintained at reflux for 3 hours. This was followed by increasing the temperature of the reaction mix at various rates until 91 percent of the theoretical distillate were collected. Note: in one case (heating rate of 10° C. per hour) the prepolymer solidified and heating was stopped at that point. The results are summarized in Table 2.

TABLE 2

| Rate of Heatup (°C./hr) | Prepolymer Physical State |
|---|---|
| 30 | Free-flowing liquid |
| 20 | Viscous liquid |
| 15 | Taffy |
| 10 | Solid |

The data show that for this particular polyarylate composition the temperature of the reaction mixture should be increased at a rate of at least 20° C. per hour. This, in turn, allows to obtain a liquid, easy to handle prepolymer.

EXAMPLE 4

This example shows the effect of the molar TPA/IPA ratios on the minimum rate of temperature increase at which an easy to handle, liquid prepolymer can be obtained. The data refer to a Bisphenol-A based polyarylate.

The prepolymers were prepared using either the 15 gallon oil heated reactor of Example 1 (TPA/IPA ratio of 85/15) or laboratory equipment as described in Example 3 (for all other acid ratios). The results are shown in Table 3.

TABLE 3

| TPA/IPA Ratio | Rate of Heatup (°C./hr)[1] | Prepolymer Physical State |
|---|---|---|
| 85/15 | 30 | Liquid |
| 90/10 | 40 | Liquid |
| 92/8 | 40 | Liquid |
| 95/5 | 45 | Liquid |
| 100/0 | 45 | Solid |

It is clear from the data of Table 3 that (a) the optimum rate of heatup is dependent on polymer composition; and (b) that even at a rate of 45° C. per hour the 100/0 TPA/IPA prepolymer is obtained as a solid; and, thus, requires a rate of temperature increase of at least 50° C. per hour in order to be handled easily.

EXAMPLE 5

This example shows the effect of the prepolymer melting point on its ability to yield high molecular weight polyarylates via the solid state polymerization process.

The prepolymers were prepared via a laboratory procedure similar to that described in Example 3. The rate at which the temperature was increased in the prepolymerization step was about 30° C. per hour and the amount of the collected distillate was about 92.2 percent of theory. Advancement of the prepolymers was performed in a tube furnace set initially at 170° C.; the temperature of the furnace was then increased to the final polymerization temperature (270° C. or 300° C., see Table 4) at 30° C. per hour and kept at that level for 4 hours. The final polyarylate was examined for physical appearance and reduced viscosity. Results are shown in Table 4.

TABLE 4

| TPA/IPA Molar Ratio | Prepolymer RV (dl/g) | Prepolymer $T_m^2$ (°C.) | Polymerization Temperature (°C.) | Final Polyarylate Physical Appearance | Final Polyarylate RV (dl/g) |
|---|---|---|---|---|---|
| 100/0 | 0.2 | 324 | 300 | soft caking | 0.73 |
| 100/0 | 0.2 | 324 | 270 | free flowing | 0.29 |
| 95/5 | 0.15 | 315 | 300 | soft caking | 0.68 |
| 95/5 | 0.15 | 315 | 270 | free flowing | 0.41 |
| 90/10 | 0.14 | 293 | 300 | soft caking | 0.64 |
| 90/10 | 0.14 | 293 | 270 | free flowing | 0.52 |
| 85/15 | 0.15 | 291 | 300 | soft caking | 0.50 |
| 85/15 | 0.15 | 291 | 270 | soft caking | 0.39 |
| 80/20 | 0.18 | 255 | 300 | agglomerated | — |
| 80/20 | 0.18 | 255 | 270 | soft caking | 0.59 |
| 70/30 | 0.15 | 168 | 270 | melt down | — |

The data show the following: (a) higher polymerization temperatures yield higher molecular weight polyarylate; (b) as the melting point of the prepolymer decreases, the final polyarylates that are obtained show generally progressively lower reduced viscosities; and (c) there was no solid-state polymerization with the low melting 70/30 (TPA/IPA) prepolymer.

Clearly, the successful preparation of Bisphenol-A polyarylates via the novel process of the instant invention requires both (1) that certain critical experimental parameters such as, for example, the heatup rate at the prepolymer stage, be carefully followed, and (2) that the polyarylates to be prepared, fall within the critical compositional range as previously defined.

What is claimed is:

1. A process for preparing polyarylates comprising the steps of (a) prepolymerizing a diester of Bisphenol-A with at least one benzene dicarboxylic acid selected from the group consisting of isophthalic acid and terephthalic acid wherein isophthalic acid constitutes at least 75 percent or no more than 25 percent of the benzene dicarboxylic acid to form a prepolymer having a melting point of at least about 200° C. and being fluid at this temperature; (b) polycondensing said prepolymer neat under agitation without agglomeration until substantially transformed into a powdery solid; maintaining said agitation to keep the powdery solid in a polydispersed nonagglomerated solid state; and continuing the polymerization below the agglomeration temperature of the polymerizing solid, until the desired molecular weight is reached.

2. A process as defined in claim 1 wherein step (a) is performed by heating at a rate of from about 10° C. to about 65° C. per hour.

3. A process as defined in claim 2 wherein step (a) is performed at the temperature of from about 270° C. to about 320° C., for a period of time sufficient to collect from about 85 to about 99 percent of the theoretical monocarboxylic acid distillate.

4. A process as defined in claim 3 wherein the reduced viscosity of the prepolymer of step (a) is from about 0.05 to about 0.4 dl/g as measured in p-chlorophenol, at 50° C., at a concentration of 0.2 g/100 ml of solution.

5. A process as defined in claim 1 wherein step (b) is performed in a sigma blade mixer at a temperature from about 260° C. to about 310° C.

6. A process as defined in claim 1 which is performed in the presence of magnesium acetate as the catalyst.

7. A process as defined in claim 1 which is performed in the presence of a phosphite stabilizer.

* * * * *

UNITED STATES PATENT AND TRADEMARK OFFICE
CERTIFICATE OF CORRECTION

PATENT NO. : 4,994,546

DATED : February 19, 1991

INVENTOR(S) : Brian A. Stern and Richard Layton

It is certified that error appears in the above-identified patent and that said Letters Patent is hereby corrected as shown below:

| Col. | Line | |
|---|---|---|
| 3 | 66 | "is" should read --its--. |
| 6 | 9 | "20°C. per hour." should read --20°C to about 60°C per hour.-- |
| 10 | 23 | INSERT AFTER TABLE 3 --[1]At lower heatup rates the prepolymers were viscous liquids or solids.-- |
| 10 | 64 | INSERT AFTER TABLE 4 --[2]Measured on a hot bar.-- |

Signed and Sealed this

Twenty-first Day of July, 1992

Attest:

DOUGLAS B. COMER

*Attesting Officer*     *Acting Commissioner of Patents and Trademarks*